United States Patent Office 3,528,761
Patented Sept. 15, 1970

3,528,761
CONTINUOUS DYEING AND PRINTING PROCESS AND DYE COMPOSITIONS SUITABLE THEREFOR
Rudolf Keller and Jakob Bindler, Riehen, Switzerland, assignors to J. R. Geigy A.G., Basel, Switzerland
No Drawing. Filed Apr. 27, 1967, Ser. No. 634,095
Claims priority, application Switzerland, May 6, 1966, 6,668/66
Int. Cl. D06p 1/10
U.S. Cl. 8—42   18 Claims

ABSTRACT OF THE DISCLOSURE

An improved process for the padding or printing of organic fibre material, especially natural or synthetic polyamide fibre materials, at temperatures below the drawing temperature of the dye used, with unthickened or thickened aqueous dye liquor or printing ink, which liquor or ink contains as carrier a mixture of a fatty acid amide in which the nitrogen atom contains one or two hydroxy-lower alkyl groups per molecule, and an anionic aromatic sulphonated dispersing agent having a higher aliphatic hydrocarbon substituent in the aromatic nucleus pre-mixed dye compositions, dye liquors and printing inks containing the aforesaid carrier.

FIELD OF THE INVENTION

The present invention concerns a process suitable for the continuous dyening and printing of organic fibre material, particularly natural or synthetic polyamide fibre material, and dye compositions suitable therefor, especially pre-mixed dye compositions, as well as dye liquors and printing inks which are suitable for use in this process.

BACKGROUND OF THE INVENTION

It is known that polyamide fibre material can be dyed by a continuous process. A known process, for example, consists in impregnating wool with an optionally thickened aqueous solution of acid wool dyestuffs at temperatures below the drawing temperature of these dyestuffs, then drying the impregnated goods passing the goods through a hot acid bath to fix the dyestuff ("acid shock process"), and rinsing the goods so treated. This process has the disadvantage that it produces uneven dyeings.

The addition of carriers to the impregnating liquor has already been suggested as further development of this process. As such, water soluble condensation products of fatty acids having 8 to 14 carbon atoms or of mixtures of such acids with two equivalents of dialkanolamine have proved to be the best. These condensation products are known as "Kritchevsky bases" and are described in the U.S. Pat. No. 2,089,212.

However, there are a number of distadvantages attached to the use of these impregnating liquors as well. Chiefly such impregnating liquors are not stable; they often separate, without apparent external influences, irreversibly after a few hours into two phases, one poor in auxiliary and the other containing the main amount of both auxiliary and of dyestuff. This separation into phases of the impregnating liquor makes uniform dyeing, particularly of large batches, more difficult, has an adverse effect on the continuous performance of the known process and also on the evenness of the dyeings and, therefore, greatly limits the uses to which this process can be put. In order to prevent the irreversible formation of phases in the dye liquor, it is necessary to carefully adjust the ratios of dyestuff, electrolyte and auxiliary in the liquor.

For a long time therefore, attempts have been made to prevent phase formation in the dye liquor. In a neutral to alkaline medium this goal was attained, for example, by using the "Kritchevsky bases" according to U.S. Pat. 2,089,212 mentioned above together with non-foaming, anion active dispersing agents from the class of aromatic sulphonic acids or the soluble salts thereof, such as tetrahydronaphthalene sulphonic acid or also methyl or dimethyl benzene sulphonic acids, in the dye liquor. According to this process described in Swiss Pat. No. 381,641, however, it is necessary to dye the fibre material in a neutral to alkaline medium which, mainly for wool, is disadvantageous and undesirable. As the technically very valuable, chromable wool dyestuffs like Eriochrome Black T®, C.I. Mordant Black 11, C.I. No. 14645, have to be after-chromed in a pH of below 5, it is impossible to use them in this process. It is because of this and other disadvantages that this process has become of no practical importance.

On further work being done on this subject, it has now been found that the use of anion active dispersing agents from the class of aromatic sulphonic acids having a higher aliphatic hydrocarbon radical, or the soluble salts thereof, instead of the non-foaming, anion active dispersing agents, in the process according to the Swiss Pat. No. 381,641, mentioned above has an advantage which is fundamental; dyeing can be preformed in an acid medium.

DESCRIPTION OF THE INVENTION

Thus, the subject of the present invention is an improved continuous deying process for the dyeing, in an acid medium, of organic fibre material, particularly of natural or synthetic polyamide fibre material, e.g. wool. This process consists in impregnating or printing this fibre material with an optionally thickened, aqueous dye liquor containing at least one dyestuff having affinity to the type of fibre to be dyed, at temperatures below the drawing temperature of the dyestuffs and finishing the dyeing or printing by an optionally humid heat treatment. This process is characterised in that, as carrier, the dye liquor contains an amount of 0.5 to 10% by weight of a mixture of:

(a) amides of aliphatic monocarboxylic acids having 8 to 14 carbon atoms or amides of mixtures of such fatty acids with primary or secondary amines, in which each amido nitrogen atom is substituted by one or two hydroxy-lower alkyl groups, and
(b) anion active dispersing agents from the clas of aromatic sulphonic acids having one higher aliphatic hydrocarbon substituent in the aromatic nucleus, or water-soluble salts thereof, the weight ratio of the acid amides to the anion active dispersing agents being about 1:1 to 5:1, and, optionally, further additives.

Aqueous dye liquors having a sufficient content of such a carrier mixture according to the invention enable dyeing or printing to be performed continuously without disturbance caused by irreversible phase formation within a wide pH range, in particular, in an acid pH between 7 and 2.

Amides usable in the dye liquor according to the invention are derived from, e.g. caprylic acid, pelargonic acid, capric acid, lauric acid, myristic acid, decyloxyacetic acid, lauryloxyacetic acid, decylthioacetic acid or laurylthioacetic acid and, preferably, from the mixture of acids comprised by the generic term "coconut oil fatty acid," and from the following aliphatic amines:

(α) from monohydroxyalkylamines such as β-hydroxyethylamine, γ-hydroxypropylamine or dihydroxyalkylamines such as β,γ-di-hydroxypropylamine;

(β) from bis-(ω-hydroxyalkyl)-amines such as bis-(β-hydroxyethyl)-amine, bis-(γ-hydroxypropyl)-amine, bis-(α-methyl-β-hydroxyethyl)-amine;

(γ) from N-alkyl-N-(hydroxyalkyl)-amines such as N-methyl- or N-ethyl- N-(β-hydroxyethyl)-amine, N-methyl- or N-ethyl-N-(γ-hydroxypropyl)-amine.

In the alkylamines named under (α), (β) and (γ), supra, the alkyl groups are preferably lower alkyl groups of at most 5, and, when substituted by hydroxyl, preferably at least 2, and optimally 2 or 3 carbon atoms.

The bis-(ω-hydroxyalkyl)-amides, mainly those having hydroxyalkyl radicals containing two or three carbon atoms such as bis-(β-hydroxyethyl)-amides or bis-(γ-hydroxypropyl)-amides of the fatty acids described above, particularly of coconut oil fatty acid, are preferred because they produce particularly good colour yields.

These amides are obtained by reacting the esters of monocarboxylic acids as defined with low alkanols, e.g. reacting the fatty acid methyl or ethyl ester with the desired amine in the presence of sodium or potassium alcoholate, e.g. according to one of the processes described in British Pat. No. 631,367.

The fatty acid/alkanolamine condensation products used in the combination according to the invention can also be produced by the process described in the U.S. Pat. No. 2,089,212 mentioned above. In this case, di- and tri-ethanolamine condensation products are preferred. They are produced by heating the fatty acids with 1 to 3 equivalents of di- and/or tri-alkanolamines, particularly diethanolamine, while splitting off more than 1 mol of water.

Aromatic sulphonic acids having a higher aliphatic hydrocarbon radical, also mixtures of these sulphonic acids, or their soluble salts, are used as foaming, anion active dispersing agents usable according to the invention, i.e., for example, alkylbenzene, alkylphenol, alkylnaphthalene and alkylnaphthol mono- or di-sulphonic acids, the alkyl radical of which can have a straight or branched chain and contains 8 to 20 and, preferably, 9 to 14 carbon atoms. Alkylbenzene and alkylphenol sulphonic acids having an alkyl radical containing 9 to 14 carbon atoms and, chiefly, 4-(1-methyl-undecyl)-benzene sulphonic acid, 4-(tetrapropylene)-benzene sulphonic acid and 4-nonylphenol sulphonic acid, are particularly suitable as these compounds yield particularly stable dye preparations and, at the same time, produce level and strongly coloured dyeings.

These sulphonic acids are generally used in the form of their water soluble salts, particularly their alkali metal or ammonium salts, but also their alkyl and hydroxyalkyl ammonium salts such as lithium, potassium, sodium, ammonium, β-hydroxyethyl- or bis-(β-hydroxyethyl)-ammonium salts can be used.

The amount of carrier mixture in the dye liquor is usually from 5 to 100 g. and, preferably, 10 to 40 g. per litre.

The weight ratio of the fatty acid amides to the salts of alkylsulphonic acid should be about 1:1 to 5:1 and preferably 1.5:1 to 2.5:1.

In addition to the acid amides and the sulphonic acids, the liquor to be used according to the invention can also contain esters of aliphatic monocarboxylic acids, having 8 to 14 carbon atoms, with low hydroxylalkylamines, also low hydroxylalkylamines and their salts with acids. By esters are meant condensation products of the monocarboxylic acids discussed under the acid amides with low mono-, di- and tri-hydroxyalkylamines.

In addition, the dye liquor can also contain substances which assist in carrying the dyestuff onto the fibre material such as thioglycolic acid or its water-soluble salts for synthetic polyamide, and o-phenylphenol for polyester fibres; solvents such as ethylene glycol monomethyl ether, thiodiethylene glycol, isopropanol or butanol; and wetting agents such as succinic acid sulphosuccinate. These additional auxiliaries are added in amounts of 3 to 20 g. per litre of dye liquor and, preferably, in amounts of 5 to 10 g. per litre.

To produce suitable impregnation liquors or printing inks for the process according to the invention, also pre-mixed dye compositions can be used which are composed substantially as follows:

(i) about 8 to 35, and preferably 10 to 20% by weight of a suitable dyestuff described below,
(ii) about 5 to 35% by weight of a carrier mixture according to the invention consisting of the amides as defined above and aromatic sulphonic acids,
(iii) 0 to 5% by weight, depending on the type of dyestuff used, of acidifying compounds such as acetic acid, formic acid, sulphuric acid or phosphoric acid, and optionally,
(iv) a thickener, preferably in aqueous solution, and
(v) a lower alkanol of from 3 to 6 carbon atoms, especially isopropanol or butanol, and/or a β-alkoxyalkanol, preferably of not more than 8 carbon atoms, in sufficient amount to enhance the stabilising of the composition on storage, (iv) and (v) being present in such amounts that the viscosity of the dye preparation is from 1 to 50 and, preferably, 10 to 40 poise, the balance of the composition consisting of water; all percentages given above being calculated on the total weight of the pre-mixed dye composition.

Impregnating liquors and printing inks usable according to the invention are produced from such dye preparations by diluting 100 to 400 g. of this dye preparation with water and, optionally thickener solution, to 1 litre depending on the colour strength desired of the dyeing.

The use of such dye preparations for the production of impregnating liquors usable according to the invention has the important advantage that they are easy to use and that, in general, the dyestuff is in extraordinarily finely distributed and, chiefly, uniform state, so that very level and well penetrated dyeings are attained.

Organic fibres which can be dyed according to the invention are, among others, those containing polyester such as cellulose di-, 2½- or tri-acetate, also however high molecular esters of aromatic polycarboxylic acids with polyfunctional alcohols, e.g. polyterephthalic acid glycol esters, also polymeric and copolymeric acrylonitrile and methacrylonitrile, polyolefins. The process according to the invention is chiefly suitable, however, for the continuous dyeing of synthetic polyamide such as Nylon 6 ("Perlon"), Nylon 66 and Nylon 11, and, in particular, of natural polyamide such as wool or silk.

The dyestuffs usable according to the invention can belong to any classes of dyestuffs desired, depending on the substrata to be dyed. They can be, for example, metal-free, heavy metal-containing, or metallisable mono-, dis- or poly-azo dyestuffs, particularly their chromium, cobalt, nickel and copper complexes, in which are also included the formazanes, as well as anthraquinone, nitro, methine, triphenylmethane and also phthalocyanine dyestuffs. They can be water soluble dyestuffs, both acid and basic, or they can be water dispersible dyestuffs.

The water soluble, so-called acid wool dyestuffs, are suitable for natural and synthetic polyamides, mainly wool, i.e. those the colouring component of which is an anion, particularly also dyestuffs containing heavy metal, namely azo dyestuffs containing chromium, cobalt or copper, preferably metallised monoazo dyestuffs containing two molecules of azo dyestuff bound to one metal atom. Also chromium dyestuffs, particularly chromable azo dyestuffs are suitable for these fibres, the latter being used, e.g., together with chromium-(III) salts or soluble chromates in acid medium. Also, the so-called "reactive dyestuffs" which react with the wool and cotton fibres and which are derived in particular from the azo, anthraquinone or phthalocyanine dyestuffs are suitable.

Dispersion dyestuffs are especially suitable for polyester fibre material whilst polyacrylonitrile fibre material, especially when having acid dyesites, is preferably dyed with aqueous solutions of suitable basic dyestuffs, e.g. with aqueous solution of methine, azomethine, tri- and diphenylmethane dyestuffs or with colour salts of the arylazo and anthraquinone series having an external onium group.

Advantageously the dye liquor or ink contains thickener. Suitable thickeners are those known in textile printing, for example, locust bean fluor, galactomannans, tragacanth, Solvitose or British gum, cellulose derivatives such as methyl cellulose or, in an alkaline medium, also the water-soluble salts of alginic acids. The preferred thickeners are those made from locust bean fluor and also galactomannans. Care should be taken to ensure that the thickener does not produce precipitations under the application conditions.

Insofar as suitable technical apparatus is available, the organic fibre material can be dyed in any form desired. For example, it can be dyed in the form of flocks, slubbing, tow, yarn or fabrics. It can also be in the form of mixed fibres which can consist of e.g. polyamides and cellulose fibres, or in the form of mixed fabrics particularly those made from a mixture of wool and polyester fibres such as cellulose 2- and 2½-acetate, cellulose triacetate and, particularly, polyterephthalic acid glycol ester fibres. Only the polyamide (e.g. wool) part can be dyed or also the polyamide and the polyester parts can be dyed simultaneously with the dyestuffs suitable for this purpose.

The dye liquors usable according to the invention are preferably heated to 40 to 60° C. before the material to be dyed is introduced. Advantageously the pH of the dye liquor is between 2 to about 8 or 9. However, dyeing in an acid pH range between 7 and 2 is generally preferred, and a pH range between 5.5 and 2 is most preferred. Acid pH values are attained, e.g. by the addition of acid substances to the dye liquor, advantageously formic or acetic acid. When dyeing natural polyamide at pH values of over 5.5 to 6, it is usually necessary to treat the fibre material, after dyeing and steaming, in an acid bath having a pH of 2 to 4.

The fibre material is impregnated, e.g. by printing, coating or spraying, preferably however, by pad dyeing. Impregnation solutions according to the invention are produced advantageously by mixing warm aqueous dyestuff solutions or dispersions of suitable concentration, which optionally contain thickeners, with the desired amount of acid amides and aromatic sulphonic acids as defined, optionally also with other additives. The polyamide fibre material is advantageously impregnated at 30 to 70° C. and then squeezed out to the desired content of impregnation liquor of about 40 to 130% of the weight of the fibre, this being done all at once or in stages.

The impregnated fibre material is finished by the usual methods adapted to the type of fibre, advantageously by steaming. Wool dyed with wool dyestuffs can also be finished by introducing the impregnated goods into a hot acid bath; synthetic polyamide and polyester are finished under thermofixing conditions, i.e. for example at temperatures of 150 to 250° C. Steaming is advantageously performed with neutral, saturated steam. Wool and silk are steamed at about 90 to 120° C. and synthetic fibres at 90 to 140° C.

The fixing of the dyestuff on the fibre material by treatment in a hot acid bath is performed by the usual methods. The content of acid is then advantageously about 3 to 20 g. per litre. The goods are best introduced into the acid bath at 80 to 98° C. Inorganic or organic acids, e.g. sulphuric acid, phosphoric acid or hydrochloric acid, or formic or acetic acid are suitable to adjust the acid pH values of the acid bath. An organic acid, particularly formic acid, is preferred. In some cases it is also useful to add water soluble salts, preferably water soluble calcium salts, to the acid bath.

Developing can be performed both by steaming as well as by introducing in a hot acid bath.

The fixed goods are advantageously rinsed, e.g. with cold or warm water which can also contain the auxiliaries usual in dyeing, e.g. formic or acetic acid or also wetting or detergent substances.

The process according to the invention for the dyeing of organic fibre material has remarkable advantages over similar known processes. The main advantage is that dyeing can be performed at a pH which extends very deeply into the acid range so that the most favourable dyeing conditions for the type of fibre can be chosen without any consideration having to be taken of the pH of the liquor. Thus, for example, because it is possible to dye also in an acid range, certain chromable dyestuffs such as Eriochrome Black T can be dyed with chrome-(III) salts which, hitherto, has been impossible. Another advantage of the process according to the invention is the better stability of the liquor. The impregnation liquor is homogeneous and substantially insensitive to electrolytes and can be stored for several days, even in an acid medium, without coacervates or irreversible dyestuff residues being formed. Also, deep shades are attained in very short fixing times which means that injuries to the fibres are avoided to a great extent.

The liquors according to the present invention draw evenly, even when mixtures of dyestuffs are used and so, after the necessary calculation, enable the dyeing recipes from conventional dyeing to be applied to pad dyeing. All this is a very considerable simplification of the similar processes hitherto known and makes more rational working possible.

On steaming hanks of fibre such as wool slubbing or tops, and similar material, which have been impregnated with dye liquors containing an effective amount of the carrier mixture according to the invention, the sticking together of the individual fibres, which leads to disturbances and faulty dyeing, is prevented; rather, desirable brief inflation of the hank occurs, the latter returning quickly to a more compact form. Compared with the known carrier mixture consisting of Kritchevsky bases and a nonfoaming emulsifying agent according to Swiss Pat. No. 381,641, or on using the individual components of the carrier mixture according to the invention, the inflation of the hank due to steaming often remains and leads to difficulties in passing the inflated hank through the usual apparatus for continuous dyeing.

The dyeings obtained by the process according to the invention are substantially free from the so-called sandwich effect which has an adverse influence on the brilliancy of the shade of the dyed goods and also on the appearance of the latter. Sandwich effects are very disturbing particularly in black, blue, green and red shades whilst they are less apparent in yellow and orange shades.

Dyeings obtained with compounds containing alkylbenzene sulphonic acids or dialkylbenzene sulphonic acids having 5 or less carbon atoms in each alkyl substituent, have a sandwich effect on being used in comparable amounts.

Finally, compared with the non-foaming anion active dispensing agents according to the cited Swiss patent, the anion active dispersing agents usable according to the invention having a higher aliphatic hydrocarbon radical have the advantage of better dyestuff dispersion, better wettability of the fibre, especially in a cold liquor and they are more easily broken down in waste liquors, particularly the compounds having straight chains; and also they make the production of concentrated, stable dye preparations possible.

The following examples serve to illustrate the invention. C.I. means Colour Index, Second Edition, 1956, published by The Society of Dyers and Colourists, Bradford, England and The American Association of Textile Chemists and Colourists, Lowell, Mass., U.S.A. Temperatures in the examples are given in degrees centigrade; all percentages are by weight unless expressly stated otherwise.

Example 1

40 g. of the chromium-containing monoazo dyestuff 2-amino-1-phenol - 4 - methylsulphone→1-phenyl-3-methyl-5-pyrazolone (dyestuff:chromium=2:1) are dissolved in a 60° warm mixture of 300 cc. of a 2.5% solution of locust bean flour (Meyprogum KN®, producer Meyhall, Kreuzlingen, Switzerland) and 30 g. of a carrier mixture consisting of 15 g. of coconut oil fatty acid-N,N-di-(β-hydroxyethyl)-amide and 15 g. of sodium salt of 4-(1-methyl-undecyl)-benzene sulphonic acid in 250 cc. of water. The solution obtained is diluted up to 900 cc. with warm water and the pH is adjusted to about 2.5 with formic acid. The temperature should be 50°. Finally the solution is made up to 1000 cc. with water. Wool flannel is impregnated with this liquor at 50°, squeezed out to a liquor content of about 100% of the dry weight of the fibre and then steamed with saturated steam for 15 minutes at 98°. The goods are then washed with an aqueous solution containing 1 g. of nonylphenol polyglycol ether per litre, then rinsed with water and washed with an aqueous solution containing 2 cc. of 85% formic acid per litre and, optionally, again rinsed with water.

A level and well penetrated orange wool dyeing is obtained which has no sandwich effect.

If in the above example, instead of the dyestuff mentioned, similar 2:1 chromium complex dyestuffs such as the chromium-containing dyestuff 5-nitro - 2 - amino-1-phenol-4-sulphonic acid amide→1-phenyl - 3 - methyl-5-pyrazolone, the chromium-containing dyestuff 2-amino-5-nitro - 1 - phenol→2-hydroxynaphthalene, the chromium-containing dyestuff anthranilic acid→1-phenyl-3-methyl-5-pyrazolone or the chromium-containing monoazo dyestuff 2-aminophenol - 4 - methyl sulpone→1-acetylamino-7-hydroxynaphthalene (each dyestuff:chromium=2:1), are used and otherwise the procedre given in the example is followed, then equally well penetrated and level red, navy blue, yellow or grey dyeings without a sandwich effect on wool flanel are obtained.

If instead of the carrier mixture given in paragraph 1, 30 g. of a mixture consisting of 15 g. of coconut oil fatty acid-N,N-di-(β-hydroxyethyl)-amide and 15 g. of the ammonium salt of p-nonylphenol sulphonic acid are used and otherwise the procedure given in the example is followed, then equally well penetrated and level dyeings are obtained.

Instead of the sodium salt, also the di- and tri-ethanolamine salt of 4-(1-methyl-undecyl)-benzene sulphonic acid can be used.

EXAMPLE 2

If wool slubbing is pad dyed in the pad dyeing liquor described in the first paragraph of Example 1 the pH of which has been adjusted to 4 with acetic acid instead of with formic acid, and the procedure given in Example 1 is followed, then equally well penetrated and level orange, red, navy blue, yellow or grey coloured wool slubbing is obtained.

Similar results are attained if, in Examples 1 and 2, instead of the carrier described in paragraph 1 of Example 1, 15, 20 or 30 g. of one of the following mixtures of auxiliaries are used:

(a) 40 g. of coconut oil fatty acid-N,N-di-(β-hydroxyethyl)-amide, 10 g. of diethanol ammonium-p-n-dodecyl-benzene sulphonate;
(b) 35 g. of coconut oil fatty acid-N,N-di-(β-hydroxyethyl)-amide, 15 g. of sodium-p-(1,3,3,5-tetramethyl-octyl)-benzene sulphonate;
(c) 20 g. of coconut oil fatty acid-N,N-di-(β-hydroxyethyl)-amide, 20 g. of diethanol ammonium-p-(1-methyl-octyl)-benzene sulphonate;
(d) 25 g. of coconut oil fatty acid-N,N-di-(β-hydroxyethyl)-amide, 25 g. of diethyl ammonium-p-nonyl phenol sulphonate;
(e) 25 g. of coconut oil fatty acid-N,N-di-(β-hydroxyethyl)-amide, 5 g. of potassium-p-(1,3,3,5-tetramethyl-octyl)-benzene sulphonate;
(f) 20 g. of coconut oil fatty acid-N,N-di-(β-hydroxyethyl)-amide, 20 g. of the sodium salt of dodecylnaphthalene sulphonic acid;
(g) 20 g. of lauric acid-N-β-hydroxypropylamide, 10 g. of the ammonium salt of decylnaphthol sulphonic acid;
(h) 20 g. of capric acid-N,N-γ-hydroxypropylamide, 15 g. of the ammonium salt of p-decylbenzene sulphonic acid.

EXAMPLE 3

40 g. of Eriochrome Black A (C.I. 15710) are slurried with 40 cc. of 25° cool water. 750 cc. of 60° warm water are added to the paste formed while stirring and the dye liquor obtained is boiled for 2 to 3 minutes. 7 g. of galactomannan thickener, slurried with 10 cc. of ethanol, are added to this solution and the dye liquor is then left to cool to about 40°.

A mixture consisting of 20 cc. of 85% formic acid, 25 g. of chromic trifluoride and 60 cc. of 20° warm water and then 25 g. of a carrier mixture consisting of 15 g. of condensation product from 1 equivalent of coconut oil fatty acid with 2 equivalents of diethanolamine (according to Example 3 of U.S. Pat. No. 2,089,212) and 10 g. of sodium-4-(1-methyl-undecyl)-benzene sulphonate (or the corresponding product known under the commercial name Marlon A 375®) are added to the dye liquor and the solution formed is made up to 1000 cc. with water.

The dye liquor obtained is very stable and can easily be left to stand for several days.

Wool slubbing is impregnated at 40° with this liquor, the goods are squeezed out to a liquor content of 80% of the dry weight and then steamed with saturated steam for 1 hour at 98°. The slubbing is then rinsed in a backwashing machine at 40°, first with an aqueous solution of 0.5 g./litre of sodium dodecyl benzene sulphonate, then with 30° warm water, after which it is then dried.

Level black coloured wool slubbing without a sandwich effect is obtained which can easily be combed and spun.

On steaming wool slubbing impregnated with the above dye liquors, the slubbing is strongly "inflated" but only for a short time, the increase in volume of the slubbing caused by the inflation effect disappearing again in a short time so that the slubbing can pass without hindrance, e.g. through the vertical can of a dye apparatus.

If in the above example, instead of the sodium-4-(1-methyl-undecyl) - benzene sulphonate, a corresponding amount of potassium - p - (1,3,3,5 - tetramethyl - octyl)-benzene sulphonate, di-(β-hydroxyethyl) - ammonium-p-(1-methyl-octyl)-benzene sulphonate or di-(β-hydroxyethyl)-ammonium-p-nonylphenol sulphonate is used then, with otherwise the same procedure, black wool dyeings of similar quality are obtained.

Equally good dyeings without a sandwich effect are obtained, if, instead of the 15 g. of the condensation product from 1 equivalent of coconut oil fatty acid with 2 equivalents of diethanolamine used in the example, 20 or 30 g. of the condensations product from 1 equivalent of coconut oil fatty acid with 2 equivalents of triethanolamine or 15, 20 or 30 g. of coconut oil fatty acid-diethanolamide are used and otherwise the procedure given in the example is followed.

Example 4

An impregnating liquor as described in Example 1 is produced but instead of 40 g. of the 2:1 chromium complex dyestuff 2-amino-1-phenol-4-methylsulphone→1-phenyl-3-methyl-5-pyrazolone, 5 g. of the 2:1 chromium complex dyestuff from 2-hydroxy-5-N-methyl-sulphamoyl-1-aminobenzene→ 1-ethoxycarbonylamino - 7 - hydroxynaphthalene are used and, instead of formic acid, 25 cc. of 80% acetic acid are used. The liquor obtained remains stable for several days.

Wool flannel is impregnated at 40° with this liquor, the goods are squeezed out to a liquor content of 100% of the dry weight and steamed for 20 minutes at 102° with saturated steam under slight excess pressure. The steamed fabric is then rinsed first with hot and then with cold water and then dried.

A very level and well penetrated pastel grey wool dyeing having no sandwich effect is obtained.

If the steaming time in the above example is extended to 30 or 60 minutes, then somewhat more strongly coloured grey wool dyeings which, however, have equally good properties are obtained.

Example 5

Wool flannel is pad dyed at 40° with an impregnation liquor produced as described in Example 1 except that instead of the azo dyestuff mentioned in the first paragraph of Example 1, it contains 20 g. of the dyestuff "Polar Brilliant Blue GAW"® (C.I. 61135 Acid Blue 127). The goods are squeezed out to a liquor content of 80% of the dry weight and then steamed for 15 minutes at 102° under slight excess pressure. They are then rinsed, first with hot and then with cold water.

A very level and well penetrated blue wool dyeing without a sandwich effect is obtained.

If, instead of Polar Brilliant Blue GAW, the dyestuff of the formula

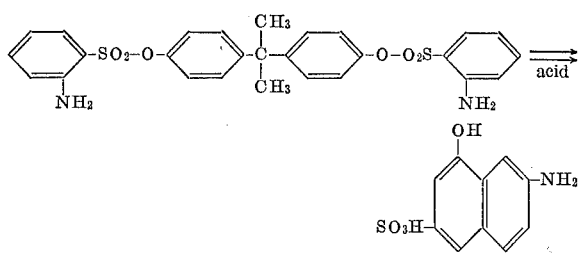

is used and otherwise the procedure given in Example 1 is followed, then equally well and evenly penetrated red material is obtained.

Example 6

4 g. of the cobalt-containing monoazo dyestuff 2-hydroxy-1-aminobenzene-5-sulphonic acid methyl amide→ 1-phenyl - 3 - methyl-5-pyrazolone (dyestuff:cobalt=2:1) are dissolved in an 80° hot solution consisting of 300 cc. of water, 7 g. of galactomannan thickener slurried with 10 cc. of ethanol, 15 g. of coconut oil fatty acid diethanolamide and the solution of 10 g. of the sodium salt of 4-(1-methyl-undecyl)-benzene - 1 - sulphonic acid (or the product known under the commercial name Marlon A 375®) in 250 cc. of water. The solution obtained is diluted with about 400 cc. of cold water and 20 cc. of 85% formic acid are added. The temperature of this impregnation liquor should be about 40°.

Grained silk is impregnated at 40° with this liquor, the goods are squeezed out to a liquor content of 80% of the dry weight and then steamed with saturated steam for 15 minutes at 102° under slight excess pressure. The fabric is then rinsed, first with hot and then with cold water.

A very level and well penetrated yellow silk dyeing without a so-called sandwich effect is obtained.

On extending the steaming time in the above example to 30 or 60 minutes, in each case somewhat more strongly coloured yellow silk dyeings having otherwise equally good properties are obtained.

If in the above example, instead of the dyestuff mentioned, the same amount of the dyestuff

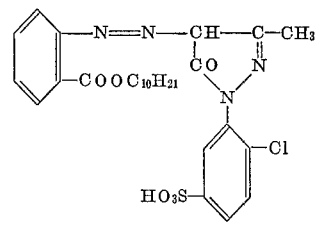

is used, then correspondingly yellow-dyed grained silk is obtained, the dyeings being equally penetrated and even.

If instead of 15 g. of coconut oil fatty acid diethanolamide, 20 g. of the condensation product from coconut oil fatty acid and 3 equivalents of diethanolamine are used and otherwise the procedure given in the example is followed, then dyeings of equally good penetration and evenness are obtained.

Example 7

Grained silk is impregnated at 40° with an impregnation liquor produced according to Example 1 paragraph 1 but using the mixture of auxiliaries mentioned under (d) in Example 2. The silk is then squeezed out to a liquor content of 80%, introduced into a 98° hot aqueous bath which contains 8 cc. per litre of 85% formic acid and is left in this bath for 5 minutes. Only an unimportant bleeding of the dyestuff into the acid bath occurs. The grained silk so dyed is then washed with a 46° warm solution of 0.5 g./litre of nonylphenol polyglycol ether and is then rinsed with cold water.

In this way, well penetrated, orange-yellow grained silk is obtained. The dyeing has good evenness and no so-called sandwich effect.

Corresponding yellow dyeings on grained silk of equally good penetration of the material and evenness of the dyeing are obtained if, instead of the dyestuff mentioned in the above example, equal amounts of the dyestuff

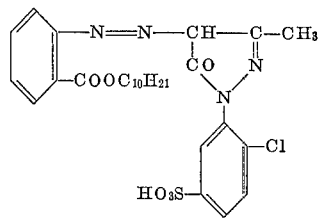

are used and otherwise the procedure given in the example is followed.

Example 8

Nylon toile is impregnated at 40° with an impregnation liquor produced according to Example 1 paragraph 1 but which contains the mixture of auxiliaries mentioned under (a) of Example 2. The goods are then squeezed out to a liquor content of 50%, introduced into a 98° hot, aqueous bath containing 4 cc./litre of 85% formic acid and the fabric is left in this bath for 4 minutes. Only an unimportant bleeding of the dyestuff into the acid bath occurs. The nylon toile so dyed is then rinsed with warm and cold water.

The nylon toile so obtained is well and evenly dyed orange.

Example 9

A toile made from poly-ε-aminocaprolactam (Perlon®, Perlon - Warenzeichenverband, Registered Company, Frankfurt am Main, Germany) is impregnated at 40° with an impregnation liquor produced according to Example 5 but which contains the mixture of auxiliaries mentioned under (a) in Example 2. The goods are then squeezed out to a liquor content of 50% and dried for 45 seconds under thermofixing conditions at 190°.

The Perlon toile so impregnated is introduced into a 98° hot, aqueous bath which contains 4 cc./litre of 85% formic acid and is treated at the boil in this bath for 4 minutes. It is then rinsed with warm and cold water.

The Perlon toile so treated is well penetrated and shows a level blue or red dyeing.

Example 10

2.5 g. of the chromium-containing monoazo dyestuff 2-carboxy - 1 - aminobenzene→1-phenyl - 3 - methyl-5-pyrazolone (dyestuff:chromium=2:1) and 0.5 g. of the chromium - containing monoazo dyestuff 2-hydroxy-5-nitro-1-aminobenzene→1-phenyl - 3 - methyl-5-pyrazolone (dyestuff:chromium=2:1) are dissolved in an impregnation liquor which is otherwise produced as described in Example 1. Wool slubbing is impregnated at 40° with this liquor, squeezed out to a liquor content of 103% of the dry weight and then steamed with saturated steam for 8½ minutes at 104° under slight excess pressure. The goods are then washed with an aqueous solution containing 1 g./litre of nonylphenol polyglycol ether and 1 cc./litre of concentrated ammonia solution, then rinsed with water and then washed with an aqueous solution containing 2 cc. litre of 85% formic acid and, optionally, again rinsed with water.

The wool slubbing so dyed is well penetrated in an orange-red shade and the dyeing has good evenness. The handle of the good is very open and voluminous and they can be combed and spun well. Even when the impregnation solutions has stood for weeks, wool slubbing which is well penetrated and evenly dyed is obtained.

Example 11

40 g. of the chromium-containing monoazo dyestuff 2-hydroxy-5-sulphomethylamido - 1 - aminobenzene→1-carboethoxyamino-7-hydroxynaphthalene (dyestuff:chromium=2:1) are stirred into a solution produced according to Example 6 which contains 10 g. of locust bean flour thickener instead of 7 g. of galactomannan thickener.

Wool slubbing is covered with this liquor in the way known for Vigoureux printing, the take-up of liquor being 85%. The covered goods are after-treated by steaming and rinsing as described in Example 11. Grey coloured wool slubbing is obtained which is distinguished by a full, voluminous handle. The goods can be combed and spun easily.

Example 12

16 g. of the dyestuff sulphanalic acid→1-hydroxy-8-[(3'-trichloropyrimidylamino) - benzoylamino]-naphthalene-3,6-disulphonic acid are slurried with 40 g. of water and then dissolved by the addition of 890 cc. of hot water and further heating. 10 g. of a thickener (Solvitose OFA®) which, for better solubility, has previously been slurried with a slight amount of ethyl alcohol, are added to this solution while stirring. After the thickener has dissolved, the solution is allowed to cool to 50° whereupon 30 g. of a carrier mixture consisting of 15 g. of pelargonic acid-N-$\beta$-hydroxyethylamide and 15 g. of sodium salt of 1-(1,3,3,5-tetramethyl-octyl)-benzene sulphonic acid and 2 g. of isopropanol are added. Also 10 g. of 85% formic acid and 30 g. of water are added to this solution.

Wool slubbing is impregnated at 50° with this pad dyeing liquor, squeezed out in a foulard to an increase in weight of about 100%. The slubbing is then steamed for 15 minutes at 100 to 102° with saturated steam. After steaming, it is rinsed with about 40° warm water, then washed at 40° with an aqueous solution which contains 1 g./litre of nonylphenol polyglycol ether and dried. Slubbing dyed red without a sandwich effect is obtained.

If instead of the 16 g. of the azo dyestuff mentioned above, 5 g. of sodium-copper phthalocyanine disulphonate are used and otherwise the procedure given in the example is followed, then slubbing dyed turquoise blue is obtained.

If instead of the carrier mixture given in the example, one of the mixtures (a to (h) in Example 2 is used then, with otherwise the procedure as given in the example, slubbing dyed red or torquoise blue without a sandwich effect is obtained.

Example 13

80 g. of Eriochrome Black T® (C.I. Mordant Black 11) and 5 cc. of 25% ammonia are dissolved in hot water and 100 cc. of a 2.5% Meyprogum KN® solution and 30 g. of a mixture consisting of 15 g. of coconut oil fatty acid-N,N-di-($\beta$-hydroxyethyl)-amide and 15 g. of sodium salt of p-n-dodecylbenzene sulphonic acid in 500 cc. of warm water are added to this solution. A previously boiled mixture consisting of 20 g. of chromium fluoride and 50 cc. of a 20% solution of chromic acetate is added to the solution obtained and this is made up to 900 cc. with warm water and 20 cc. of 85% formic acid are added to the solution. The solution is then made up to 1000 cc. with water. The temperature of the finished solution should be about 50°.

Wool slubbing is impregnated with this liquor at 50°, squeezed out to a liquor content of about 100% and steamed for 30 minutes at 98° with saturated steam.

The slubbing is then rinsed at 40° in the first bath of a Lissuese apparatus and is treated for 15 to 30 seconds at a temperature of 70° in the second Lisseuse bath with a solution of 10 g./litre of sodium bichromate and 8 cc./litre of 85% formic acid. The slubbing is then rinsed in further Lisseuse baths with water of about 40°.

Wool slubbing evenly dyed black is obtained which can easily be combed and spun.

Example 14

If in Example 1, instead of the 2:1 chromium complex dyestuff, 50 g. of a mixture of dyestuffs consisting of the orange coloured 2:1 chromium complex dyestuff of the formula

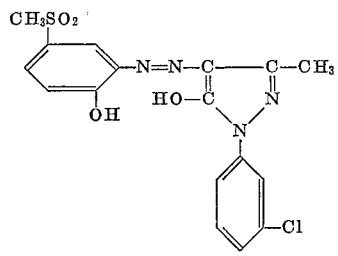

the red dyestuff of the formula

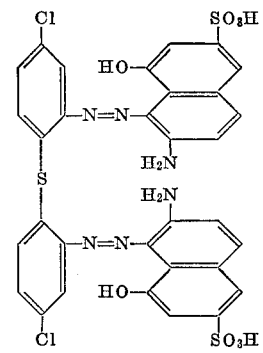

and the blue dyestuff of the formula

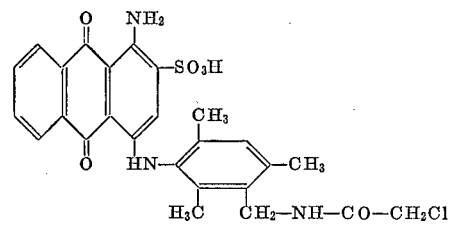

(weight ratio 22:22:6) are used and, instead of 20 cc., 15 cc. of 85% formic acid are used and the procedure given in Example 1 is followed, then wool slubbing evenly dyed brown-red and having similar properties is obtained.

Example 15

A fabric consisting of 45 parts of wool and 55 parts of Terylene® (ICI, Manchester, England) is impregnated and steamed analogously to Example 1. An orange dyeing is obtained on the wool part whilst the polyester part remains practically undyed.

Example 16

A mixed fabric made of wool and cellulose triacetate is impregnated and steamed analogously to Example 1. An orange dyeing is obtained on the wool part whilst the triacetate part remains practically undyed.

Example 17

11 g. of the dystuff of the formula

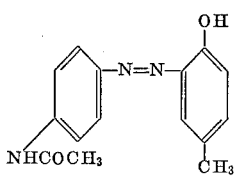

are dispersed in an 80° hot mixture of 200 cc. of a 2.5% aqueous sodium alginate solution and 35 g. of a carrier mixture consisting of 20 g. of coconut oil fatty acid-N,N-di-($\beta$-hydroxyethyl)-amide and 15 g. of the sodium salt of p-decylphenol sulphonic acid and 2 cc. of isopropanol. The solution obtained is made up to about 1000 cc. with warm water and the pH should be about 7. Orlon® (polyacrylonitrile fibre of E. I. du Pont de Nemours, Wilmington, Del., USA) slubbing is impregnated at 30° with this solution squeezed out to about 100% (calculated on the dry weight) and steamed with saturated steam for 30 minutes at 98°. It is then washed with an aqueous solution containing 1 g./litre of nonylphenol polyglycol ether and rinsed with cold and warm water. Slubbing dyed yellow is obtained.

If instead of the 11 g. of the dyestuff given above, the same amount of the dyestuff 1-amino-2-methoxy-4-hydroxy-anthraquinone are used and otherwise the procedure given in the example is followed, then Orlon® slubbing dyed red is obtained.

Instead of Orlon®, Leacryl® (Acsa, Italy) or Acrilan® Regular (Chemstrand, Decatur, Ala., USA) can be dyed in the same way with the same pad dyeing liquors.

Example 18

20 g. of the dyestuff

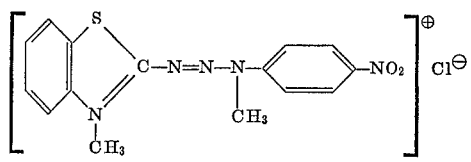

are pasted with 20 cc. of 80% acetic acid, dissolved in 500 cc. of water and thereafter a 60° warm mixture of 200 cc. of a 2.5% aqueous Meyprogum KN® solution and 30 g. of a carrier consisting of 9 g. of sodium salt of 4-(1-methyl-undecane)-benzene-1-sulphonic acid, 9 g. of coconut oil fatty acid-N,N-di-($\beta$-hydroxyethyl)-amide and 250 cc. of water are added. The solution obtained is diluted with warm water to 1000 cc. and the pH of the solution is adjusted to 4 with 80% acetic acid.

Orlon slubbing is impregnated at 30° with this solution, squeezed out to about 130% (calculated on the dry weight) and steamed for 30 minutes at 102° with saturated steam. It is then washed with an aqueous solution containing 1 g./litre of nonylphenol polyglycol ether and then rinsed with warm and with cold water. Orlon slubbing dyed yellow is obtained.

Leacryl or Acrilan Regular can be dyed in the same way with the same pad dyeing liquors instead of Orlon.

Example 19

360 cc. of water are placed in a tank fitted with a turbomixer and 360 g. of the dyestuff 1-amino-6-nitro-2-hydroxynaphthalene-4-sulphonic acid→2 - hydroxynaphthalene, in the form of the filter cake, are added in portions while stirring and the whole is stirred for 1 hour. 120 g. of a dyestuff carrier consisting of 60 g. of coconut oil fatty acid-N,N-di-($\beta$-hydroxyethyl)-amide and 60 g. of the sodium salt of 4-(1-methyl-undecyl)-benzene sulphonic acid and 10 g. of 80% acetic acid are mixed in a second mixer. This homogeneous mixture is slowly poured, while stirring continuously, into the dyestuff suspension and the whole is then stirred for 15 minutes whereupon a ready-for-use, homogeneous, brown dye preparation is obtained.

An impregnation liquor is produced by stirring 300 g. of this dye preparation with 350 cc. of warm water (60°) and 100 cc. of an aqueous 2.5% locust bean flour thickener solution. 40 g. of chromic trifluoride and 20 cc. of 85% formic acid are added to the resultant solution and then the liquor is made up to 1 litre with warm water. Wool slubbing is impregnated with this liquor as described in Example 2.

Wool slubbing evenly dyed black is obtained which can easily be combed and spun. The dyeing has good fastness to washing and light.

We claim:

1. A process for coloring organic fiber material which comprises padding or printing said fiber material at a temperature below the drawing temperature of the dye with an unthickened or thickened aqueous dye liquor or printing ink, respectively, containing a dye having affinty to the type of fiber to be dyed, and finishing the dying or printing by an optionally humid heat treatment, wherein said dye liquor comprises, as carrier, an amount of 0.5 to 10% by weight calculated on the total weight of the liquor of a mixture of
    (a) an amide of a fatty acid having 8 to 14 carbon atoms and a primary or secondary amine, in which each amido nitrogen atom is substituted by one or two hydroxy-lower alkyl groups and
    (b) an anionic dispersing agent from the class consisting of mono- and di-sulfonic acids of alkylbenzene, alkylphenol, alkylnaphthalene and alkylnaphthol, the alkyl radical of which contains from 8 to 20 carbon atoms, and water-soluble salts thereof, the weight ratio of components (a):(b) ranging from about 1:1 to 5:1.

2. A process as claimed in claim 1, wherein component (a) is an amide of coconut oil fatty acid with primary or secondary amine having at least one hydroxy-lower alkyl group per molecule.

3. A process as claimed in claim 1, wherein said amide defined under (a) is that of a fatty acid of from 9 to 14 carbon atoms and
    ($\alpha$) a monohydroxyalkylamine,
    ($\beta$) a bis-($\omega$-hydroxyalkyl)-amine or
    ($\gamma$) an N-alkyl-N-(hydroxyalkyl)-amine,
"alkyl" groups under ($\alpha$), ($\beta$) and ($\gamma$) having at most 5 carbon atoms.

4. A process as claimed in claim 1, wherein component (a) is a bis-($\omega$-hydroxy-lower alkyl)-amide of coconut oil fatty acid.

5. A process as claimed in claim 1, wherein component (b) is an alkylbenzene monosulphonic acid in which the alkyl radical has from 8 to 20 carbon atoms, or a water-soluble salt of such acid.

6. A process as claimed in claim 1, wherein component (b) is dodecylbenzene sulphonic acid or a water-soluble salt thereof.

7. A process as claimed in claim 1, wherein the impregnation liquor contains a thickener to impart to said liquor a viscosity of from about 1 to 50 poise.

8. A process as claimed in claim 1, wherein the weight ratio of components (a):(b) is in the range of from about 1.5:1 to 2.5:1.

9. A process as claimed in claim 1, wherein said organic fibre material is a polyamide fibre material.

10. A process as claimed in claim 9, wherein said dye is a water-soluble acid wool dyestuff.

11. A process as claimed in claim 9, wherein said dye is a metallisable acid dyestuff and said liquor contains a water-soluble salt of chromic acid as further additive to convert said metallisable dyestuff to the corresponding chromium complex.

12. A process as claimed in claim 9, wherein said organic fibre material is wool.

13. A process as claimed in claim 9, further comprising the step of steaming the dyed polyamide material, introducing the same into a hot acid bath, or subjecting the same to both aforesaid after-treatments.

14. A dye composition for coloring organic fiber material by continuous dying or printing, comprising
  (I) a dye having affinity to the type of fiber to be dyed and
  (II) as carrier, in an amount of 0.5 to 10% by weight calculated on the total weight of the liquor, a mixture of
    (a) an amide of a fatty acid having 8 to 14 carbon atoms and a primary or secondary amine, in which each amido nitrogen atoms is substituted by one or two hydroxy-lower alkyl groups and
    (b) an anionic active dispersing agent from the class consisting of mono- and di-sulfonic acids alkylbenzene, alkylphenol, alkylnaphthalene and alkylnaphthol, the alkyl radical of which contains from 8 to 20 carbon atoms, and water-soluble salts thereof, the weight ratio of components (a):(b) being about 1:1 to 5:1.

15. A dye composition as described in claim 14, further comprising thickener to impart to the composition a viscosity in the range of from 1 to 50 poise.

16. A pre-mixed dye composition comprising (i) from about 8 to 35% by weight of dyestuff, (ii) from about 5 to 35% by weight of a carrier mixture consisting essentially of (a) an amide of a fatty acid having 8 to 14 carbon atoms and a primary or secondary amine, in which each amido nitrogen atoms is substituted by one or two hydroxy-lower alkyl groups and (b) an anionic dispersing agent from the class consisting of mono- and di-sulfonic acids of alkylbenzene, alkylphenol, alkylnaphthalene and alkylnaphthol, the alkyl radical of which contains from 8 to 20 carbon atoms, and water-soluble salts thereof, the weight ratio of components (a):(b) ranging from about 1:1 to 5:1 and (iii) from 0 to 5% by weight of an acidifying compound, the balance of the composition consisting of water, the above percentages being calculated on the basis of the total weight of the dye composition.

17. A pre-mixed dye composition as described in claim 16, further comprising:
  (iv) thickener to impart to said composition a viscosity between 1 and 50 poise.

18. A pre-mixed dye composition as described in claim 16, further comprising:
  (v) lower alkanol of from 3 to 6 carbon atoms, β-alkoxyalkanol of at most 8 carbon atoms, or a mixture of both, to enhance the stability of the composition on storage.

References Cited

UNITED STATES PATENTS

| | | | |
|---|---|---|---|
| 3,391,985 | 7/1968 | Zurbuchen et al. | 8—54 |
| 2,089,212 | 8/1937 | Kritchevsky | 260—124 |
| 2,092,429 | 9/1937 | Straub et al. | 8—42 |
| 2,206,928 | 7/1940 | Ulrich et al. | 8—88 |

FOREIGN PATENTS 381,641  10/1964  Switzerland.

GEORGE F. LESMES, Primary Examiner

T. J. HERBERT, JR., Assistant Examiner

U.S. Cl. X.R.

8—43, 172, 173, 178